United States Patent [19]

Okada et al.

[11] Patent Number: 5,402,142
[45] Date of Patent: Mar. 28, 1995

[54] DRIVE CIRCUIT FOR DISPLAY APPARATUS

[75] Inventors: Hisao Okada, Ikoma; Yuji Yamamoto, Kobe; Tadatsugu Nishitani, Kuze; Toshihiro Yanagi, Nara, all of Japan

[73] Assignee: Sharp Kabushiki Kaisha, Osaka, Japan

[21] Appl. No.: 934,389

[22] Filed: Aug. 21, 1992

[30] Foreign Application Priority Data

Aug. 22, 1991 [JP] Japan .................. 3-211149

[51] Int. Cl.$^6$ .............................................. G09G 3/36
[52] U.S. Cl. ........................................ 345/95; 345/94; 345/100; 345/198
[58] Field of Search .............. 340/784, 793, 805; 345/100, 94, 95, 98

[56] References Cited

U.S. PATENT DOCUMENTS

| | | | |
|---|---|---|---|
| 4,393,380 | 7/1983 | Hosokawa | 340/805 |
| 4,413,256 | 11/1983 | Yasuda | 340/784 |
| 5,184,118 | 2/1993 | Yamazaki | 340/784 |
| 5,214,417 | 5/1993 | Yamazaki | 345/95 |

FOREIGN PATENT DOCUMENTS

| | | |
|---|---|---|
| 0196889 | 10/1986 | European Pat. Off. . |
| 0199361 | 10/1986 | European Pat. Off. . |
| 0216168 | 4/1987 | European Pat. Off. . |
| 0360523 | 3/1990 | European Pat. Off. . |
| 0415349 | 3/1991 | European Pat. Off. . |
| 0436384 | 7/1991 | European Pat. Off. . |
| 3-89393 | 4/1991 | Japan . |
| 3-177890 | 8/1991 | Japan . |

*Primary Examiner*—Alvin E. Oberley
*Assistant Examiner*—Minsun Oh
*Attorney, Agent, or Firm*—David G. Conlin; Peter F. Corless

[57] ABSTRACT

A drive circuit for a display apparatus includes an input section for receiving a digital video signal, a voltage supply section for generating a common electrode voltage and a plurality of gradation voltages, a driving section for selecting one of the plurality of gradation voltages according to the input digital video signal and applying the selected gradation voltage to one of the pixel electrodes, and for applying the common electrode voltage to the common electrode, the common electrode voltage being shifted based on a certain relationship so that a central value of the common electrode voltage is different from central values of the gradation voltages.

9 Claims, 11 Drawing Sheets

DRIVE CIRCUIT FOR DISPLAY APPARATUS

BACKGROUND OF THE INVENTION

1. Field of the Invention

The present invention relates to a drive circuit for a display apparatus which operates in response to digital video signals, and more particularly to a drive circuit for a display apparatus whose pixels need to be driven by an a. c. voltage and are liable to deterioration or breakage if they are driven by a d.c. voltage, such as a liquid crystal display (LCD) apparatus.

2. Description of the Prior Art

Hereinafter, a TFT (thin film transistor) liquid crystal display (LCD) apparatus will be described as a typical example of a type of a display apparatus in which the driving circuit of the present invention can be used.

FIG. 6 shows a source driver which is a part of a drive circuit for a TFT liquid crystal display apparatus. Digital video signal data are input to the source driver. In this example, it is assumed that the input digital video signal data consist of two bits (D1, D0) having four distinct values "0" to "3". The source driver selects one of the gradation voltages $V_0$ to $V_3$ which are supplied by voltage supply section 1 according to each value of the input digital video signal data, and outputs the selected voltage to source lines $O_n$.

FIG. 7 shows a circuit corresponding to nth output portion of the source driver shown in FIG. 6. The circuit includes a D-type flip-flop (sampling flip-flop) $M_{SMP}$ at a first stage and a flip-flop (holding flip-flop) $M_H$ at a second stage which are provided for receiving each bit of the digital video signal data, a decoder DEC, and analog switches $ASW_0$ to $ASW_3$ for electrically connecting lines from the voltage supply section 1 with source lines $O_n$. For the sampling of the digital video signal data, various circuits are available as alternatives to the D-type flip-flop.

The digital source driver shown in FIG. 7 operates as follows:

The sampling flip-flop $M_{SMP}$ latches the digital video signal data (D1, D0) at the rising edge of a sample pulse $T_{SMPn}$ corresponding to the nth pixel. When the sampling for one horizontal period is completed, an output pulse OE is fed to the holding flip-flop $M_H$. Then, the data (D1, D0) held in the sampling flip-flop are moved to the holding flip-flop $M_H$ and are simultaneously output to the decoder DEC. The decoder DEC decodes the 2-bit data (D1, D0) and recognizes a value of the data (D1, D0). In accordance with the value of the data (D1, D0), the decoder DEC makes one of the analog switches $ASW_0$ to $ASW_3$ conductive. As a result, the corresponding one of four gradation voltages $V_0$ to $V_3$ is output to the source line $O_n$.

FIG. 8 shows waveforms of the gradation voltages $V_0$ to $V_3$, and a common electrode voltage $V_{COM}$ applied to a common electrode for a LCD panel. The gradation voltages $V_0$ to $V_3$ are higher in this order, and are applied to the pixels. This relationship is expressed as follows:

$|V_0-V_{COM}| \leq |V_1-V_{COM}| \leq |V_2-V_{COM}| \leq |V_3-V_{COM}|$, where the reverse relationship can also be used.

As shown in FIG. 8, the gradation voltages $V_0$ to $V_3$ and the common electrode voltage $V_{COM}$ alternately change between two voltage levels synchronously with a signal POL which is reversed for each output period.

Alternatively, the common electrode voltage $V_{COM}$ may be d.c. voltage. Each level of the gradation voltages is determined to be symmetrical with respect to a given voltage (a central voltage) VM.

FIG. 9 shows each level of the gradation voltages $V_0$ to $V_3$ seen from a common electrode to which the common electrode voltage $V_{COM}$ is applied.

A particular pixel is charged with one of the gradation voltages shown in FIG. 9 when the pixel is selected by a gate driver (a scanning driver). If the pixel is selected at a beginning of a horizontal period when the gradation voltage is positive (i.e. the gradation voltage is higher than the common electrode voltage $V_{COM}$) and the positive gradation voltage is applied to the selected pixel during the horizontal period, then it is controlled so that a negative gradation voltage (i.e. the gradation voltage is lower than the common electrode voltage $V_{COM}$) corresponding to the positive voltage is applied to the selected pixel during the next horizontal period.

Thus, each pixel is changed with the gradation voltage which alternately changes between a positive voltage level and a negative voltage level, that is, an a.c. voltage, resulting in preventing a d.c. voltage from being applied to the pixel as an average value.

Under an ideal condition, the known drive circuit mentioned above protects the pixels against breakage or deterioration due to the application of d.c. voltage. However, an actual liquid crystal display apparatus can not be completely protected in such a manner because of the fact that the voltages applied to the pixels in a liquid crystal display panel are not the same as the gradation voltages $V_0$ to $V_3$ and the common electrode voltage $V_{COM}$. The cause of this voltage difference is explained as follows:

FIGS. 12, 13 and 14 show equivalent circuits of a pixel portion including a pixel capacitance $C_{LC}$ and an additional capacitance $C_S$ which are connected in parallel to a common electrode COM. In FIG. 12, $C_{gd}$ represents a parasitic capacitance present between the gate and drain of a thin film transistor (TFT) 10.

When the voltage of the gate line $G_n$ is high ($V_{GH}$), the TFT 10 is turned on. As a result, a voltage $V_S$ of the source line $O_n$ is applied to the pixel. Then, the following equations are established among charges $q_1$, $q_2$ and $q_3$ in the capacitances shown in FIG. 13:

$$q_1+q_2+q_3 = \text{constant}$$

$$q_1/C_{LC} = q_2/C_S = V_S$$

$$q_3 = C_{gd} \cdot (V_S - V_{GH})$$

Accordingly, the following equation (1) is obtained:

$$(C_{LC}+C_S+C_{gd}) \cdot V_S = \text{constant} + C_{gd} \cdot V_{GH} \qquad (1)$$

On the other hand, when the voltage of the gate line $G_n$ is low ($V_{GL}$), the TFT 10 is turned off. As a result, the following equations are established among charges $q_1'$, $q_2'$ and $q_3'$ in the capacitances shown in FIG. 14:

$$q_1'+q_2'+q_3' = \text{constant}$$

$$q_1'/C_{LC} = q_2'/C_S = V_S'$$

$$q_3' = C_{gd} \cdot (V_S' - V_{GL})$$

Accordingly, the following equation (2) is obtained:

$$(C_{LC}+C_S+C_{gd})\cdot V_S' = \text{constant} + C_{gd}\cdot V_{GL} \quad (2)$$

From the equations (1) and (2), the following equation (3) is derived.

$$V_S - V_S' = C_{gd}\cdot(V_{GH}-V_{GL})/(C_{LC}+C_S+C_{gd}) \quad (3)$$

As is evident from the foregoing equations, while the voltage of the gate line $G_n$ is high ($V_{GH}$), the pixel is charged with the voltage $V_S$, and after the TFT 10 turns off, the voltage $V_S$ is varied into a voltage $V_S'$. The difference between $V_S$ and $V_S'$ is represented by equation (3).

The difference $V_S-V_S'$ is observed as a variation of the pixel characteristics caused by the application of a positive and a negative gradation voltages to the pixels, when the positive and negative gradation voltages are actually applied to the driving terminal of a LCD panel. As a result, some of d.c. voltage components are applied to the pixels in a LCD panel according to the driving voltages shown in FIG. 8, which is described below in more detail.

FIG. 10 shows an exemplary relationship between a gradation voltage (an absolute value) input to a LCD panel and transmissivity characteristics of the pixels in a LCD panel. The gradation voltage is applied to the driving terminal of a LCD panel. In FIG. 10, a scale of the horizontal axis is determined so that a relationship between an absolute value of a negative gradation voltage and the transmissivity characteristics is represented as a straight line.

The $V_N^+$ and $V_N^-$ (where N=0, 1, 2, 3) represent positive gradation voltages and negative gradation voltages which are required to achieve the same transmissivity characteristics of pixels in a LCD panel respectively. For example, $V_3^+$ and $V_3^-$, as well as $V_0^+$ and $V_0^-$, which are required to achieve the same transmissivity characteristics of the pixel in a LCD panel are shown in FIG. 10. The positive and negative voltages are defined by the differences between the gradation voltages $V_N$ and the common electrode voltage $V_{COM}$, as mentioned above. $\Delta V_N$ represents a difference between the voltages $V_N^+$ and $V_N^-$.

FIG. 11 shows a relationship between a negative gradation voltage (an absolute value) applied to the driving terminal of a LCD panel and the difference $\Delta V_N$. FIG. 11 teaches that a positive gradation voltage $V_N^+$ should be substantially equal to a voltage obtained by adding the difference $\Delta V_N$ to an absolute value of a negative gradation voltage $V_N^-$ in order to achieve the same transmissivity characteristics of the pixel.

For example, a case where the gradation voltage is $V_3$ (N=3) will be described below. Assuming that a LCD panel is driven with the gradation voltage which has a waveform shown in FIG. 9, and that an absolute value of the difference between the gradation voltage $V_3$ and the common electrode voltage $V_{COM}$ in FIG. 9 is substantially equal to a voltage represented by $V_3$ in FIG. 10. In such a case, a difference $\Delta t_3$ in the transmissivity characteristics occurs depending on which voltage is applied to a pixel, a positive gradation voltage or a negative gradation voltage, as shown in FIG. 10.

If the absolute value of the positive and negative gradation voltage levels actually applied to the pixels are different from each other, the pixel characteristics (for example, the transmissivity of liquid crystal in a case where a LCD panel is used) are varied, even though the display apparatus is not broken or deteriorated. The variation of the pixel characteristics causes a flicker effect of the image.

Further, the application of a d.c. voltage to the pixels causes not only a deterioration of the display apparatus but also a so-called "after static image" problem where a static image remains visible in the display even after the static image is deleted. In the display apparatus in which a static image is the primary mode of display, such as a terminal display device for a computer, the problem is serious.

SUMMARY OF THE INVENTION

The drive circuit of the present invention includes a section for receiving a digital video signal, a voltage supply section for generating a common electrode voltage and a plurality of gradation voltages, each of the plurality of gradation voltages alternately changing between two voltage levels, a driving section for selecting one of the plurality of gradation voltages according to the input digital video signal and applying the selected gradation voltage to one of the pixel electrodes, and for applying a common electrode voltage to the common electrode, the common electrode voltage being shifted based on a relationship between a driving voltage input to the display panel and the transmissivity characteristics of the pixels of a display panel so that a central value of the common electrode voltage is different from central values of the gradation voltages.

In another embodiment, the drive circuit of the present invention includes a section for receiving a digital video signal, a voltage supply section for generating a common electrode voltage and a plurality of gradation voltages, each of the plurality of gradation voltages alternately changing between two voltage levels, a driving section for selecting one of the plurality of gradation voltages according to the input digital video signal and applying the selected gradation voltage to one of the pixel electrodes, and for applying a common electrode voltage to the common electrode, at least one of the gradation voltages being shifted based on a relationship between a driving voltage input to a display panel and the transmissivity characteristics of the pixels of the display panel so that a central value of at least one of the gradation voltages is different from one of the central values of the remaining gradation voltages.

Thus, the invention described herein makes possible the advantages of (1) providing a drive circuit which can reduce the ratio of d.c. voltage components to be applied to the pixels, (2) providing a drive circuit which can reduce a flicker effect of the image, and (3) providing a drive circuit which can improve an "after static image" problem.

These and other advantages of the present invention will become apparent upon reading and understanding the following detailed description made with reference to the accompanying figures.

DESCRIPTION OF THE PREFERRED EMBODIMENTS

The invention is described in detail by way of the following examples.

EXAMPLE 1

Figure 10:
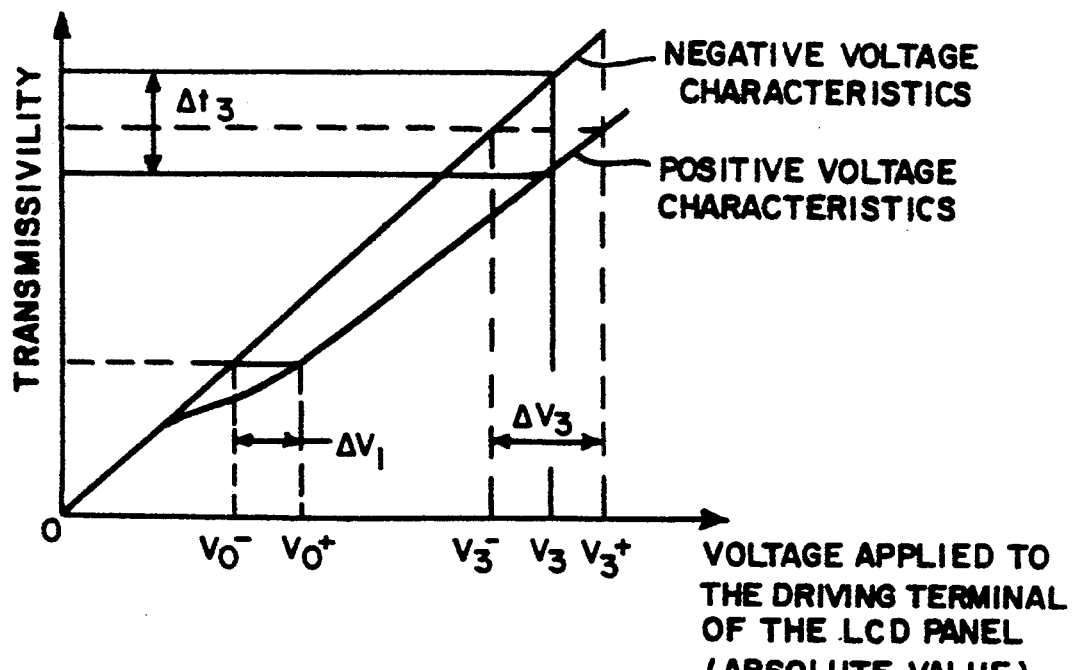
FIG. 10 is a graph showing the relationship between a voltage input to a LCD panel and a transmissivity of the pixels of a LCD panel.

In this example, $\Delta V_N$ in FIG. 10 is compensated by adjusting the common electrode voltage $V_{COM}$.

Figure 2:
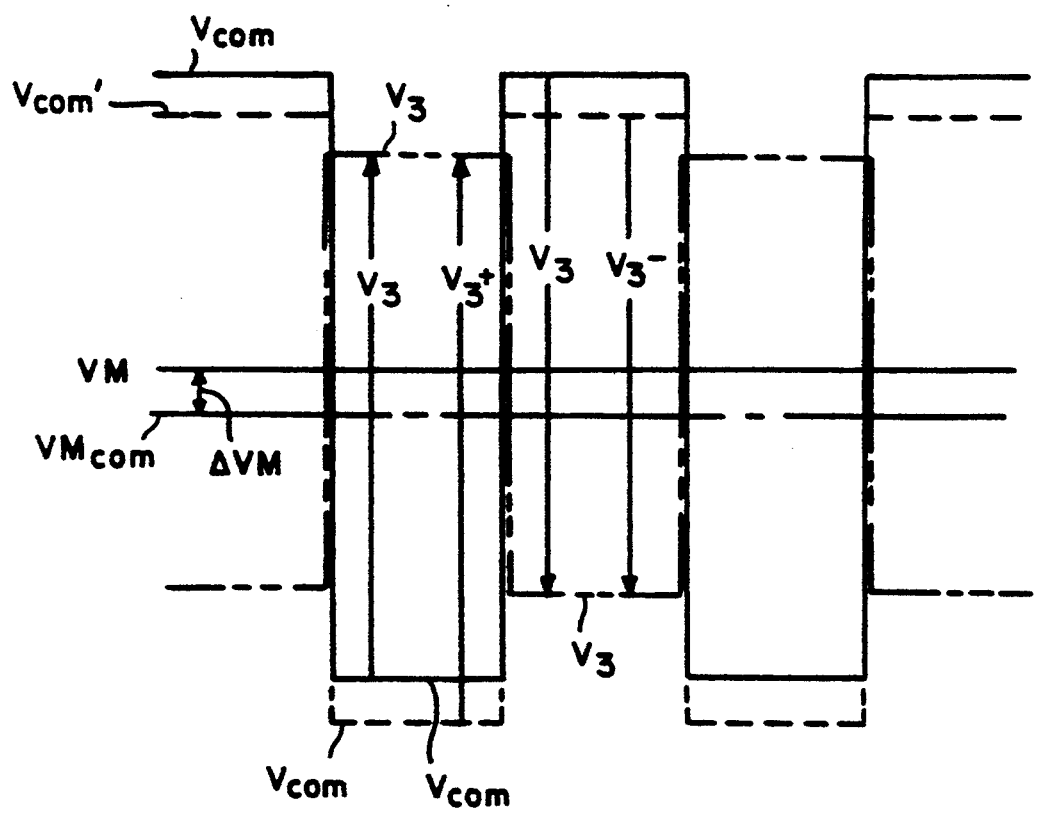
FIG. 2 is a diagrammatic view showing waveforms of the gradation voltages and the common electrode voltage.

FIG. 2 shows waveforms of the gradation voltage $V_3$ and the common electrode voltage $V_{COM}'$ which has been adjusted based on the relationship shown in FIG. 10. As shown in FIG. 2, the common electrode voltage $V_{COM}$ is shifted so that a central value $VM_{COM}$ of the common electrode voltage $V_{COM}'$ is different from the central voltage VM by $\Delta VM$. As a result, a positive gradation voltage $V_3^+$ may be higher than a negative gradation voltage $V_3^-$ by $\Delta V_3$. This makes it possible to apply the gradation voltages $V_3^+$ and $V_3^-$ as shown in FIG. 10 to the driving terminal of a LCD panel.

Figure 1:
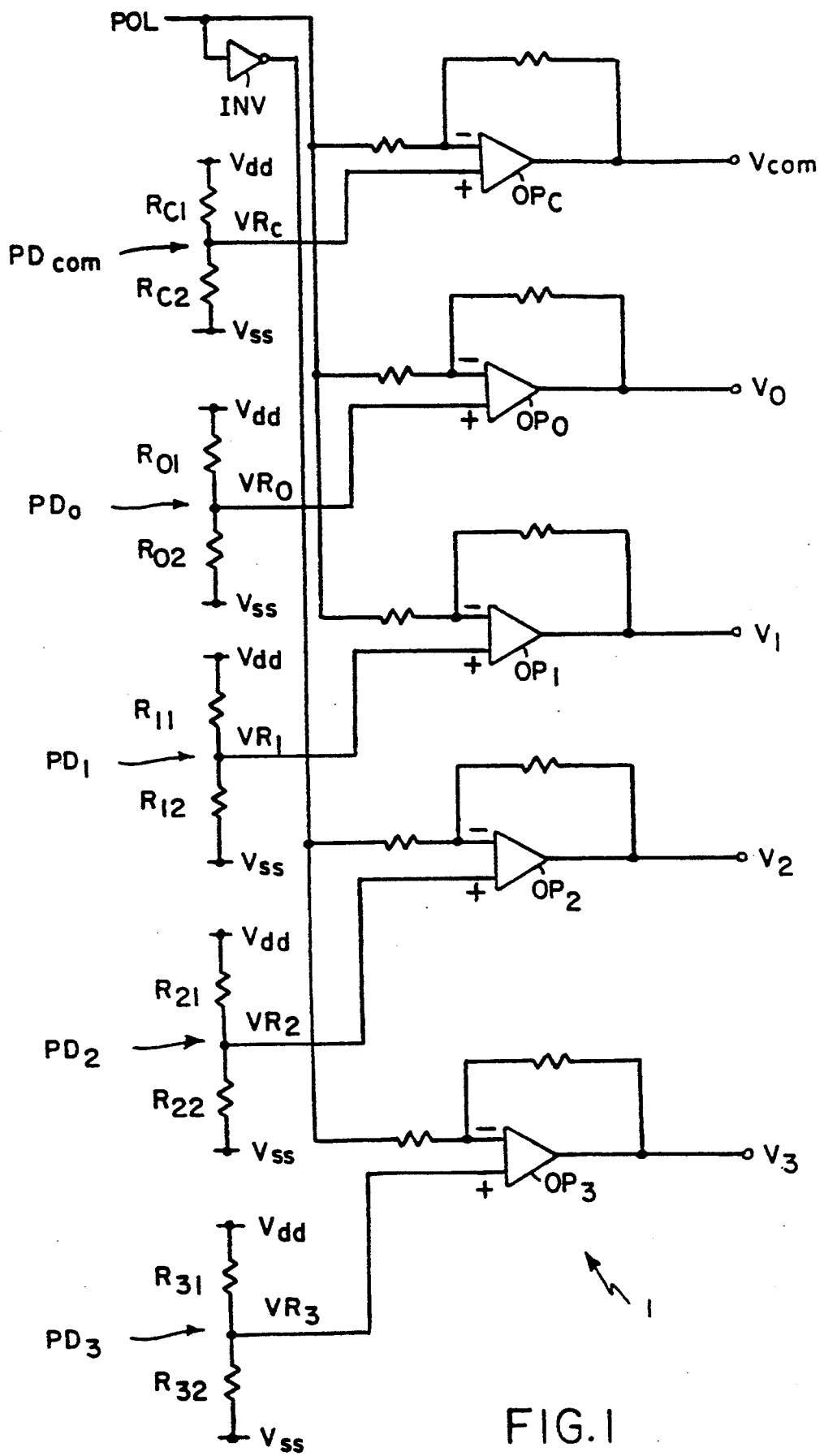
FIG. 1 is a circuit diagram showing the voltage supply section in Example 1.
Figure 6:
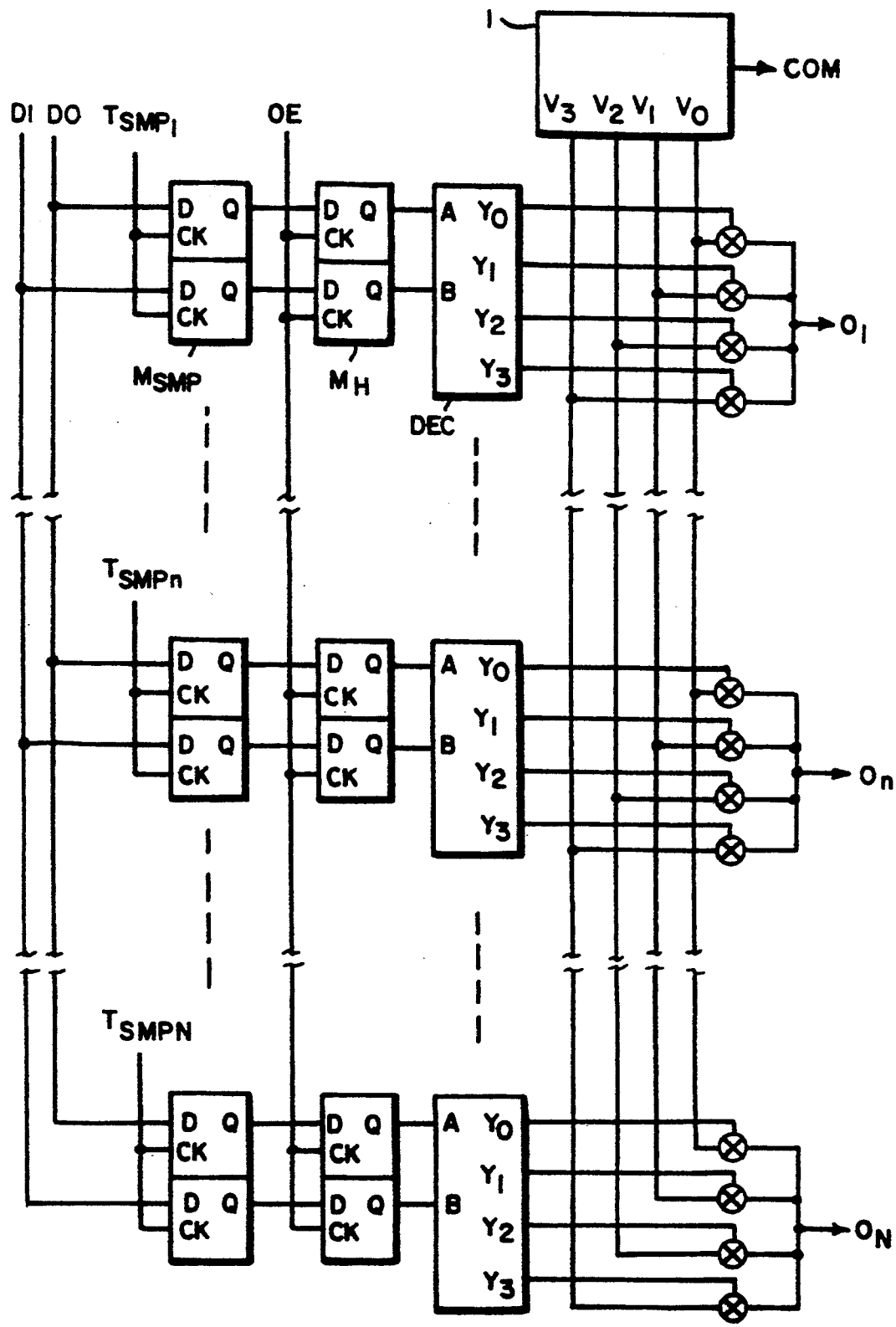
FIG. 6 is a circuit diagram showing a driving circuit for a liquid crystal display apparatus.

FIG. 1 shows an exemplary circuit for the voltage supply section 1. The drive circuit for a display apparatus shown in FIG. 6 is exemplary of just one type of circuit which may be used in Example 1 through 5 where the voltage supply section 1 is varied. The present invention is not limited by this specific type of drive circuit. Other drive circuits may be used for the voltage supply section 1 to generate the common electrode voltage and the gradation voltages as defined by this invention.

Figure 8:
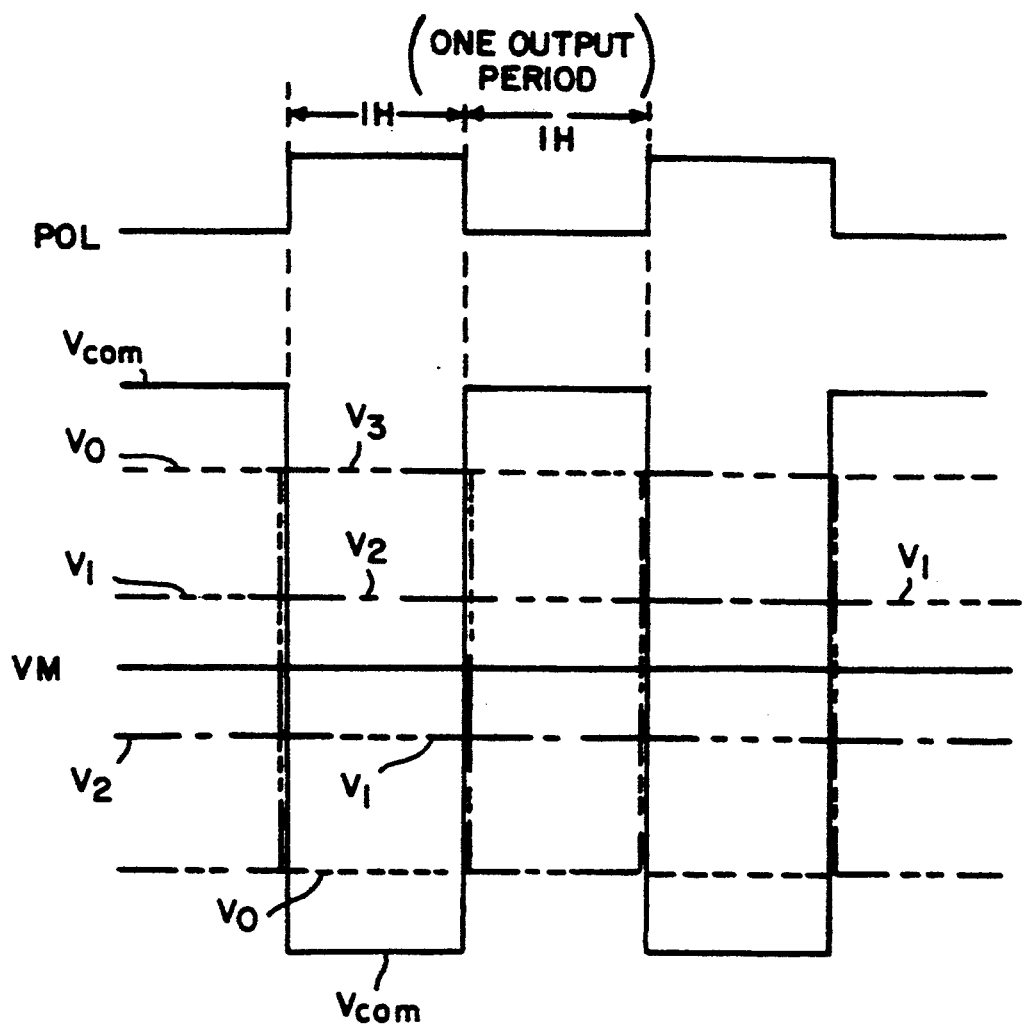
FIG. 8 is a diagrammatic view showing the waveforms of the gradation voltages and the common electrode voltage.
Figure 9:
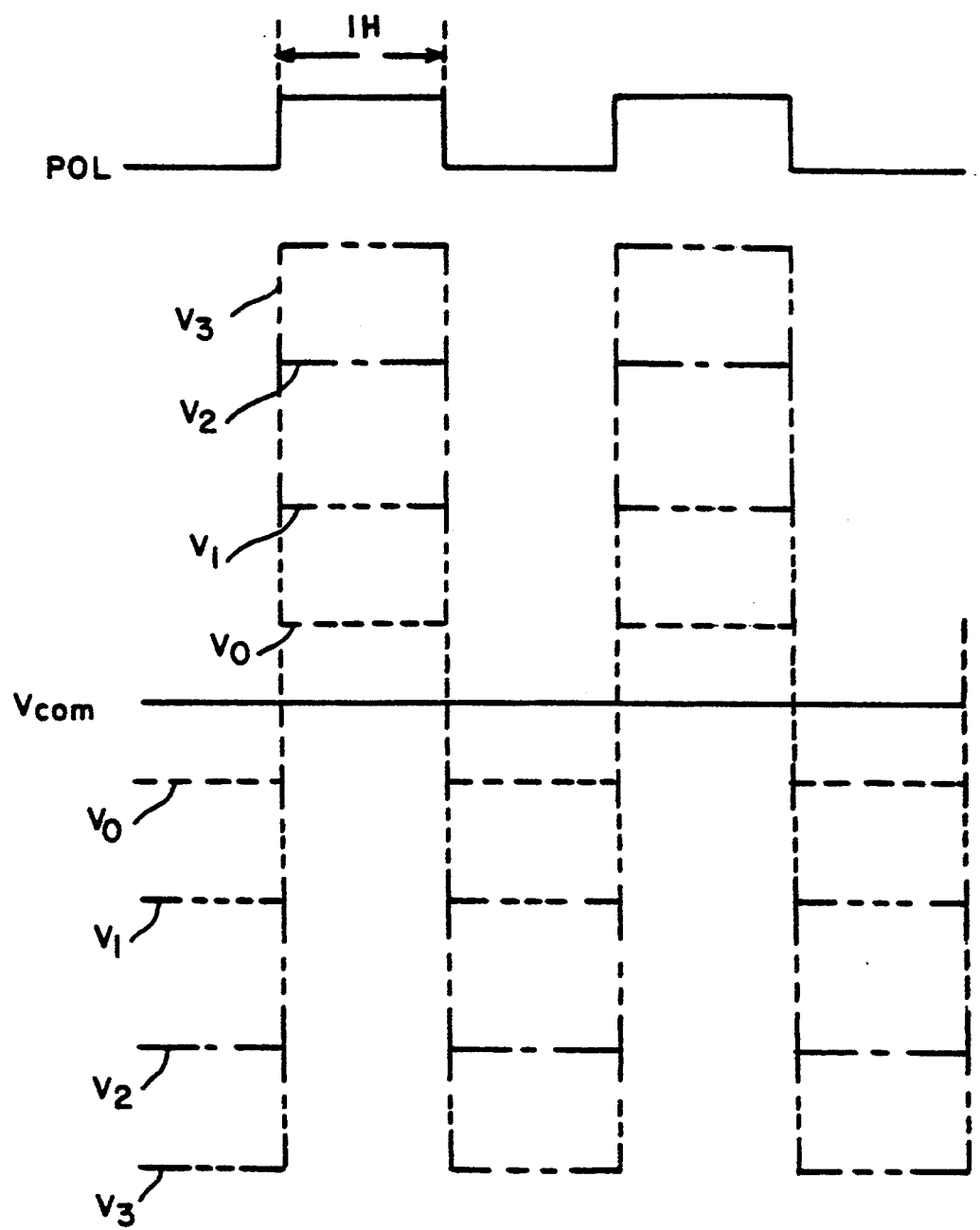
FIG. 9 is a diagrammatic view showing the waveforms of the gradation voltages and the common electrode voltage when viewed from the common electrode.

The circuit shown in FIG. 1 includes an operational amplifier $OP_C$ for generating the common electrode voltage $V_{COM}$, and operational amplifiers $OP_0$ to $OP_3$ for generating the gradation voltages $V_0$ to $V_3$. The operational amplifiers $OP_C$, $OP_0$, and $OP_1$ receive a signal POL at their inverted inputs, and the operational amplifiers $OP_2$ and $OP_3$ receive the signal POL at their inverted inputs through an inverter INV. Each operational amplifier $OP_C$, $OP_0$ to $OP_3$ receives a respective output of resistance type potential dividers $PD_C$, $PD_0$ to $PD_3$ at their non-inverted inputs. Operational amplifiers $OP_C$, $OP_0$ to $PO_3$ generate voltages $V_{COM}$ and $V_0$ to $V_3$ which altenately change between two voltage levels synchronously with the signal POL, and a central value of the two voltage levels is substantially equal to the voltage at the non-inverted inputs of each operational amplifier. Further, phases of the voltages $V_{COM}$, $V_0$ and $V_1$ are opposite to those of the voltages $V_2$ and $V_3$ as shown in FIG. 8. The amplitudes of these voltages depend upon the amplification factors of the operational amplifiers.

Each resistance type potential divider $PD_C$, and $PD_0$ to $PD_3$ has two fixed resistances, one being connected at one end to a power source $V_{dd}$ having a plus potential, and the other being connected at one end to a power source $V_{ss}$ having a ground potential. As a result, the voltage $VR_C$ at the junction of the fixed resistances $R_{C1}$ and $R_{C2}$ of the resistance type potential divider $PD_{COM}$ becomes $\{R_{C2}/(R_{C1}+R_{C2})\}V_{dd}$. This voltage $VR_C$ is applied to the non-inverted input of the operational amplifier $OP_C$ as an output voltage of the resistance type potential divider $PD_{COM}$. Similarly, the voltage $VR_0$ to $VR_3$ at the respective junctions of the fixed resistances $R_{01}$ and $R_{02}$, $R_{11}$ and $R_{12}$, $R_{21}$ and $R_{22}$, and $R_{31}$ and $R_{32}$ become $\}R_{02}/(R_{01}+R_{02})\}V_{dd}$, $\{R_{12}/(R_{11}+R_{12})\}V_{dd}$, $\{R_{22}/(R_{21}+R_{22})\}V_{dd}$, and $\{R_{32}/(R_{31}+R_{32})\}V_{dd}$.

Accordingly, the values of the output voltages $VR_C$, $VR_0$ to $VR_3$ are determined by setting resistance ratios of fixed resistances. In this example, the resistance ratios are set to satisfy the following relationship:

$$R_{C2}/R_{C1} < R_{02}/R_{01} = R_{12}/R_{11} = R_{22}/R_{21} = R_{32}/R_{31}$$

Therefore, the output voltages satisfy the following relationship.

$$VR_C < VR_0 = VR_1 = VR_2 = VR_3$$

As shown in FIG. 2, the central value $VM_{COM}$ of the output voltage $V_{COM}$ of the operational amplifier $OP_C$ is shifted away from the central voltage VM by $\Delta$ VM toward the low voltage side. The central voltage VM is substantially equal to the central value of the output voltages $V_0$ to $V_3$ of the other operational amplifiers $OP_0$ to $OP_3$.

For simplicity, FIG. 2 shows only the voltages $V_{COM}$ and $V_3$. By shifting the voltage $V_{COM}$ as mentioned above, the positive gradation voltage $V_3^+$ becomes substantially equal to a voltage obtained by adding the difference $\Delta$ VM to the voltage $V_3$. On the other hand, the negative gradation voltage $V_3^-$ becomes substantially equal to a voltage obtained by subtracting the difference $\Delta$ VM from the voltage $V_3$. The difference $\Delta$ VM can be determined by setting appropriately the output voltages $VR_C$ and $VR_3$ (i.e. the values of the fixed resistances in the resistive potential dividers).

Accordingly, the determination of the values of the fixed resistances makes it possible to obtain the voltages $V_3^+$ and $V_3^-$ which do not result in direct application of a d.c. voltage to the pixels, and keep the tramsmissivity constant irrespective of the positive and negative gradation voltages.

Figure 11:
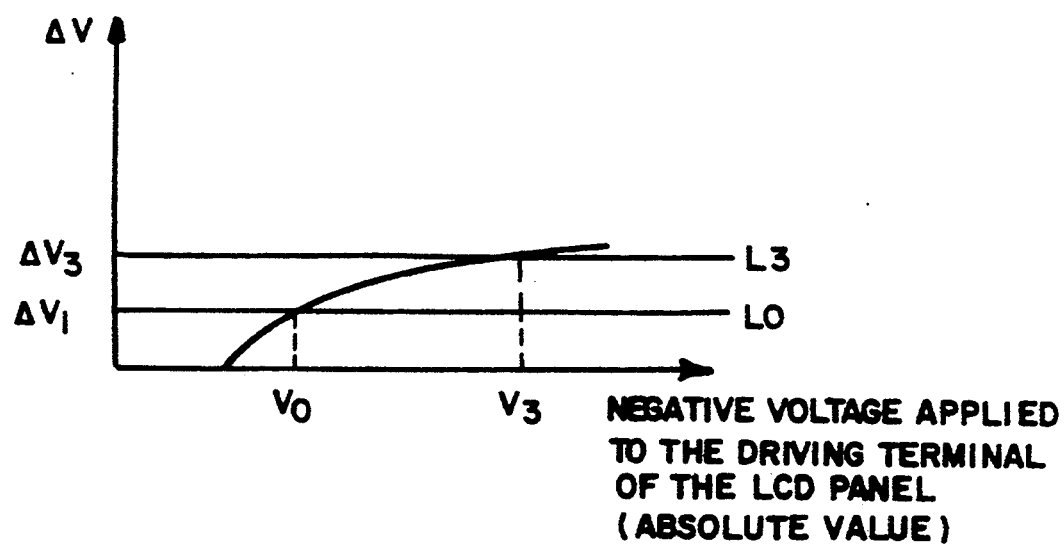
FIG. 11 is a graph showing the relationship between a negative voltage input to a LCD panel and a difference between $V_N^+$ and $V_N^-$.
Figure 12:
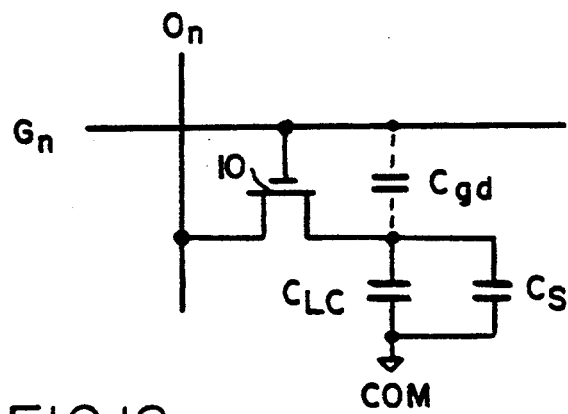
FIG. 12 is an equivalent circuit of the pixel portion.
Figure 13:
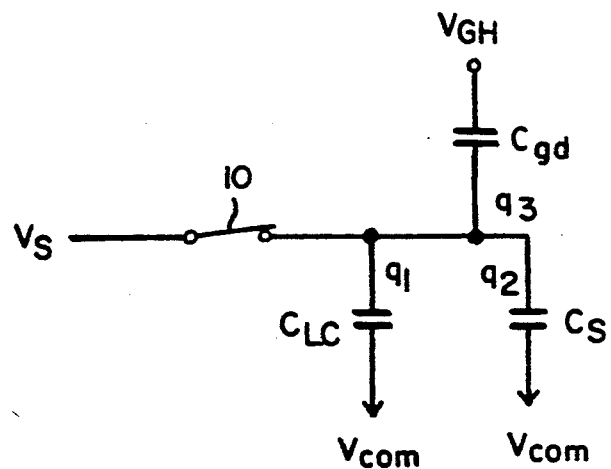
FIG. 13 is an equivalent circuit wherein the switching element (TFT) is in on-state.
Figure 14:
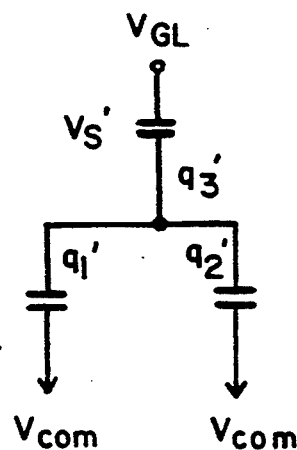
FIG. 14 is an equivalent circuit wherein the switching element (TFT) is in off-state.

This can be effectively applied to other voltages applied to the pixels on the basis of voltages $V_0$ to $V_2$ to avoid applying a d.c. voltage directly to the pixels. The difference $\Delta$ VM may be adjusted to be an optimum value between the lines L0 and L3 in FIG. 11 so that d.c. componets applied to the pixels are minimized.

EXAMPLE 2

In this example, $\Delta$ $V_N$ in FIG. 10 is compensated by adjusting the common electrode voltage $V_{COM}$ for each display apparatus.

Figure 3:
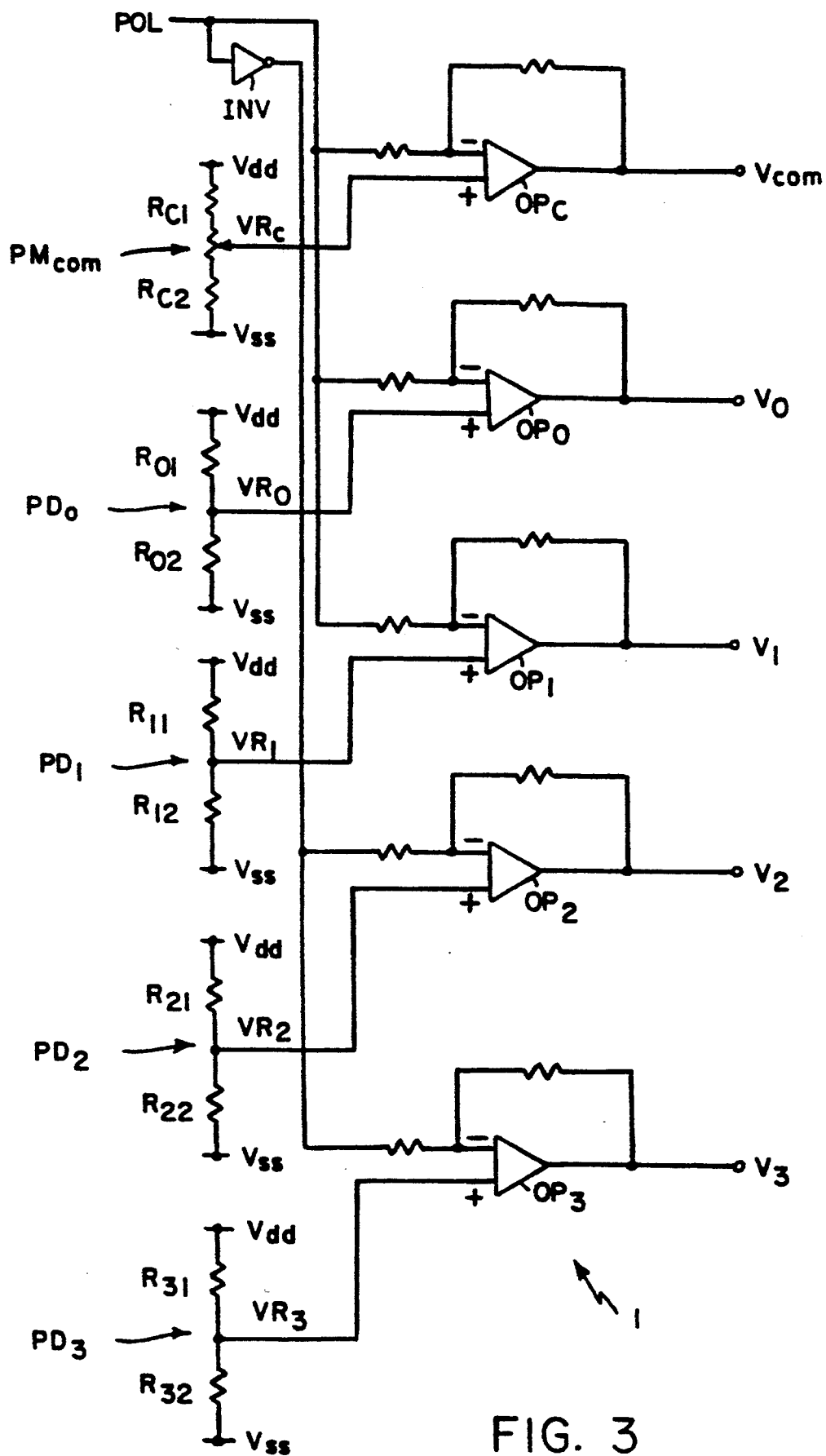
FIG. 3 is a circuit diagram showing the voltage supply section in Example 2.

FIG. 3 shows an exemplary circuit for a voltage supply section 1 used in another embodiment. The circuit shown in FIG. 3 includes a potentiometer $PM_{COM}$ in place of the resistance type potential divider $PD_{COM}$ described in Example 1. In this structure, a value of the output voltage $VR_C$ of the potentiometer $PM_{COM}$ which is applied to the non-inverted inputs of the operational amplifier $OP_C$ can be adequately adjusted. This means that the difference $\Delta$ VM can be adjusted so that optimum display characteristics of each display apparatus can be obtained.

EXAMPLE 3

In this example, $\Delta$ $V_N$ in FIG. 10 is compensated by adjusting the graduation voltages $V_0$ to $V_3$ independently.

Figure 4:
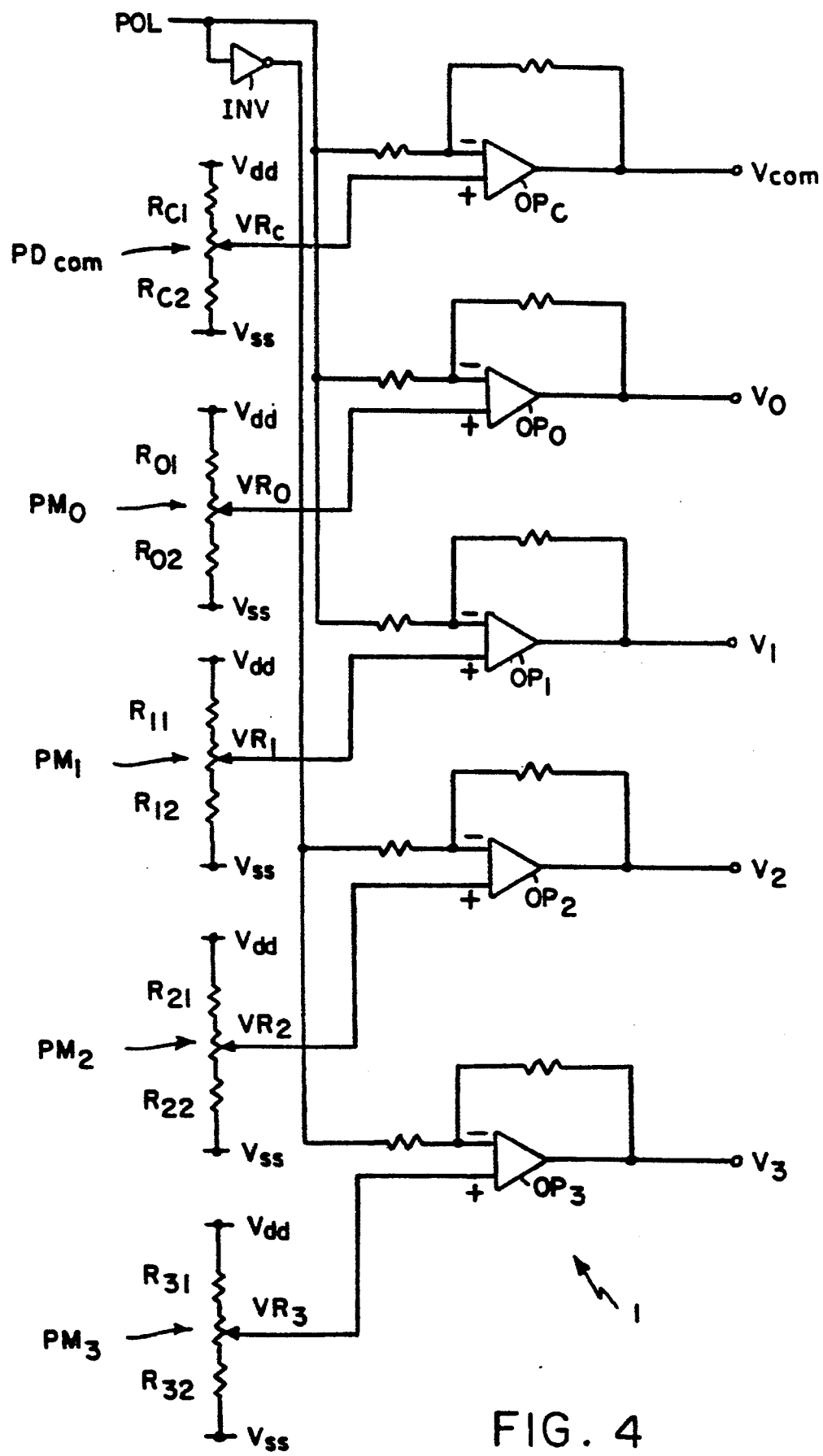
FIG. 4 is a circuit diagram showing the voltage supply section in Example 3.

FIG. 4 shows an exemplary circuit for a voltage supply section 1 used in another embodiment. The circuit shown in FIG. 4 includes potentiometers $PM_0$ to $PM_3$ in place of the resistance type potential dividers $PD_0$ to $PD_3$ set forth in Example 1. Values of the output voltages $VR_0$ to $VR_3$ of the potentiometer $PM_0$ to $PM_3$ which are applied to the non-inverted inputs of the operational amplifiers $OP_0$ to $OP_3$ can be independently adjusted. In this structure, each of the gradation voltages $V_0$ to $V_3$ is shifted so that each central value of the gradation voltages $V_0$ to $V_3$ is different from the central voltage VM shown in FIG. 2. The distance shifted away from the central voltage VM may be different among the gradation voltages $V_0$ to $V_3$. Thus, since all of the gradation voltages are independently adjusted, optimum display characteristics in each gradation level of a display apparatus can be obtained so that d.c. components applied to the pixels are minimized.

EXAMPLE 4

In this example, $\Delta$ $V_N$ in FIG. 10 is compensated by adjusting the common electrode voltage $V_{COM}$ and the gradation voltages $V_0$ to $V_3$, independently.

As is evident from the combination of the circuit in Example 2 with the circuit in Example 3, it is possible to obtain a circuit for the voltage supply section 1 in which all of the resistance type potential dividers $PD_C$, and $PD_0$ to $PD_3$ in shown in FIG. 1 have been replaced by potentiometers. Such a circuit allows independent adjustment of the common electrode voltage $V_{COM}$ and the gradation voltages $V_0$ to $V_3$.

EXAMPLE 5

Figure 15:
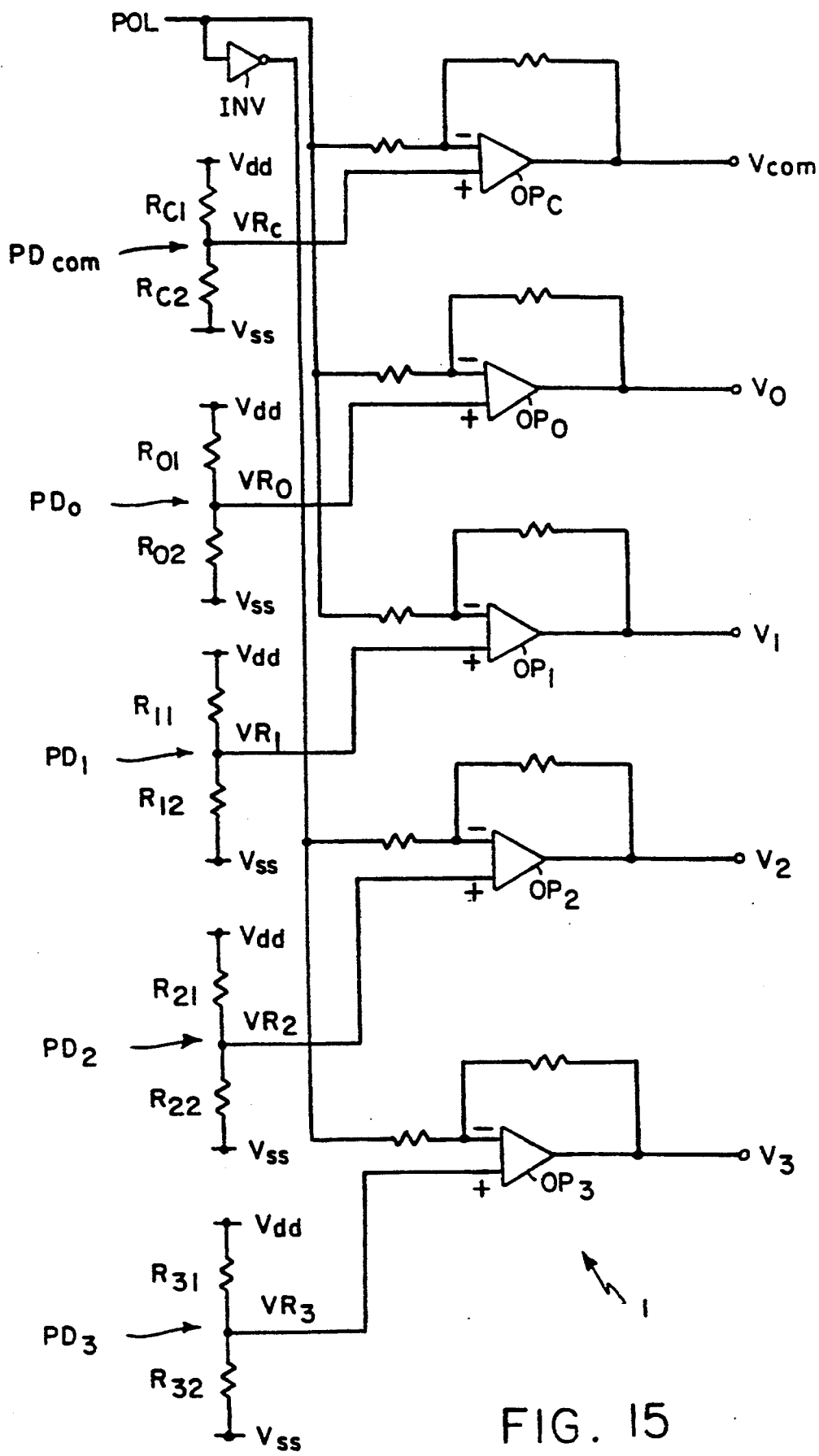
FIG. 15 is a circuit diagram showing the voltage supply section in Example 5.
Figure 2:
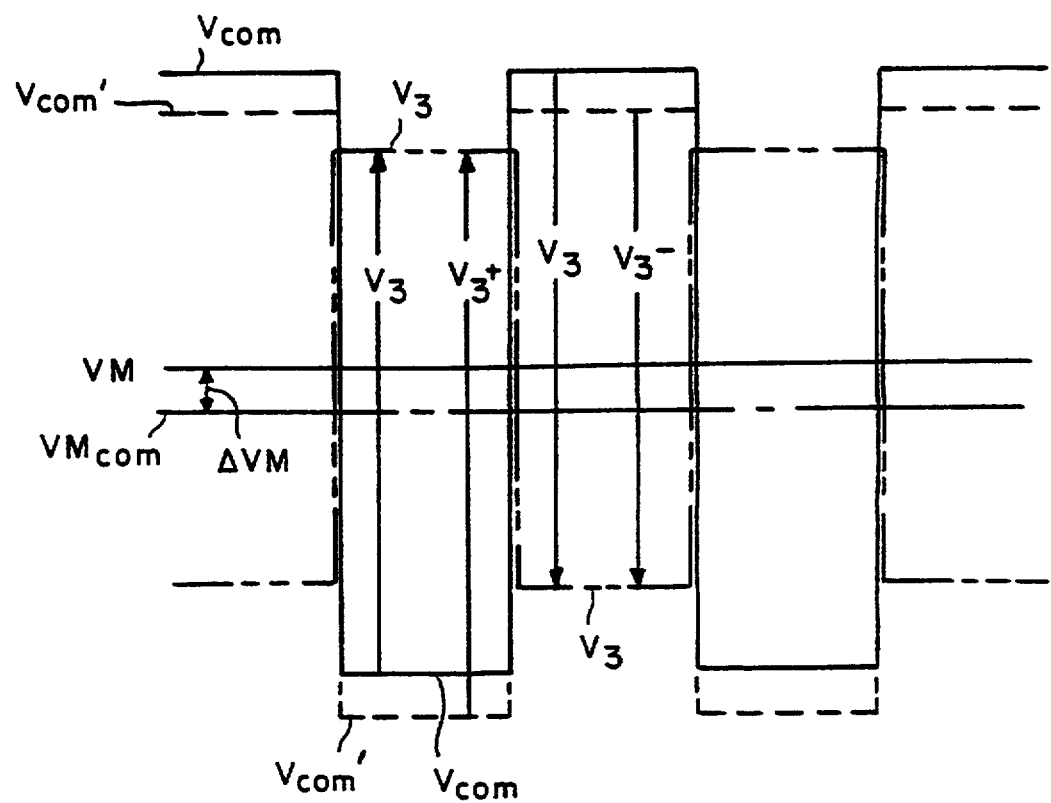
Figure 15:
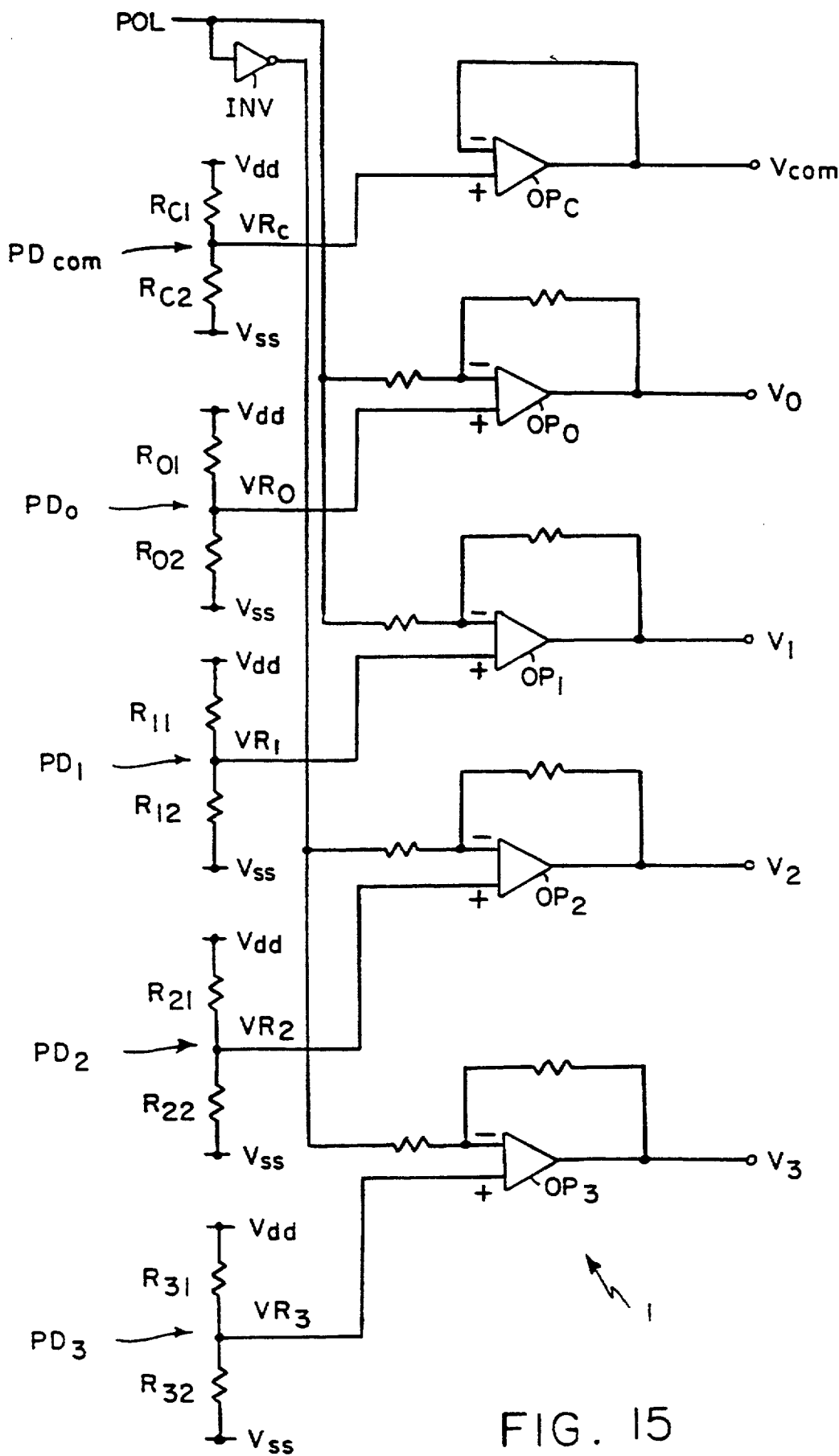

FIG. 15 shows an exemplary circuit for the voltage supply section 1 used in another embodiment. According to this circuit, the common electrode voltage $V_{COM}$ output from the operational amplifier $OP_C$ is any d.c. voltage. This configuration can be applied to any circuits for the voltage supply section 1 mentioned above.

Figure 5:
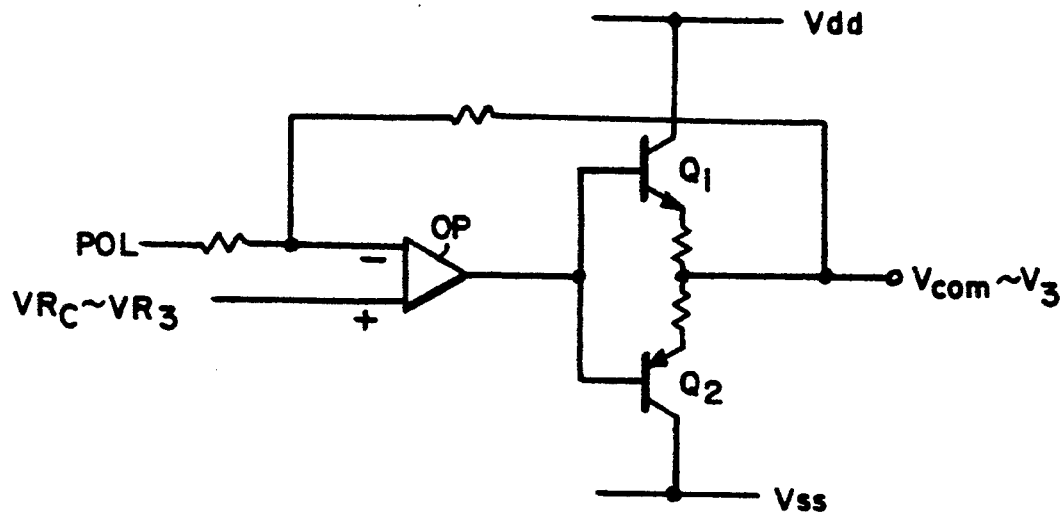
FIG. 5 is a circuit diagram showing an operational amplifier of the voltage supply section.
Figure 7:
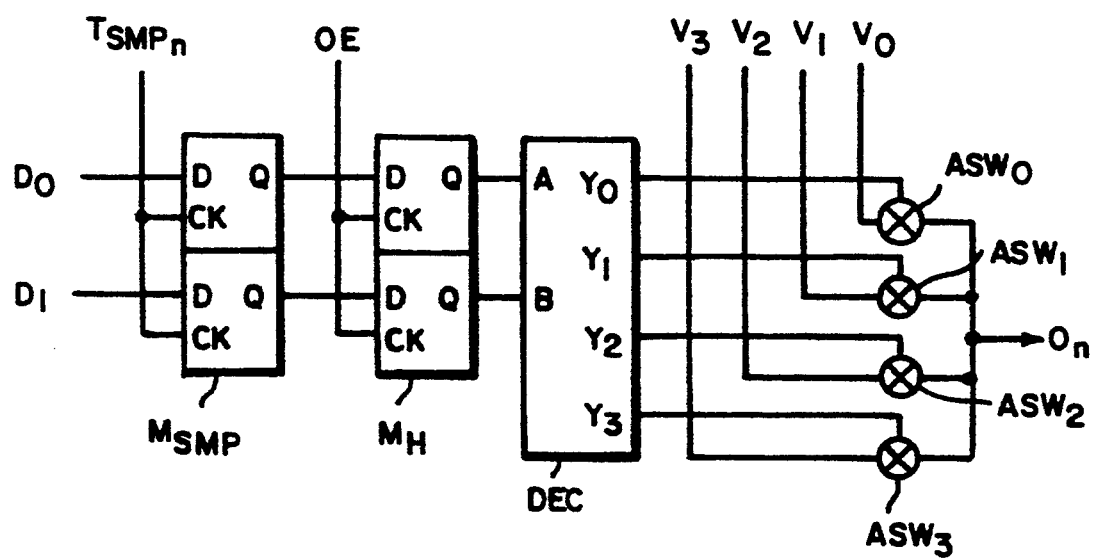
FIG. 7 is a circuit diagram showing a part of the driving circuit shown in FIG. 6.

The operational amplifiers $OP_C$, $OP_0$ to $OP_3$ mentioned above may have a configuration as shown in FIG. 5. In FIG. 5, the output of the operational amplifier OP is amplified by means of a bidirectional current amplifier circuit including two transistors $Q_1$ and $Q_2$. This configuration can be applied to any circuits for the voltage supply section 1 mentioned above. When the output of the current amplifier circuit are used as the common electrode voltage $V_{COM}$ and the gradation voltages $V_0$ to $V_3$, the same effect set forth can be obtained. Since a current capacity of the operational amplifier OP may be small enough to drive the transistors $Q_1$ and $Q_2$, it makes possible to use an operational amplifier having a small current capacity.

According to the present invention, the ratio of a d.c. component applied to the pixels of a LCD panel can be reduced. As a result, the display apparatus is not likely to be broken or deteriorated, and also the "after static image" problem can be much improved.

Further, since the same transmissivity characteristics of the pixels is achieved regardless of the application of the positive or negative gradation voltages to the pixels, the flicker effect of the image can be reduced.

Based on the observation of the flicker effect of the image for each gradation level, the voltages supplied by the voltage supply section 1 may be adjusted so that the flicker effect of the image be minimized. In the inspection for adjustment, it is preferable that distinct reference patterns are prepared for each gradation level and a reference pattern which causes the flicker effect most radically is used.

For reasons mentioned above, a display apparatus having much improved reliability and quality can be obtained.

Various other modifications will be apparant to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A drive circuit for a display apparatus having a display panel which includes a plurality of pixels, pixel electrodes and a common electrode for driving said plurality of pixels, said drive circuit comprising:
means for receiving a digital video signal;
voltage supply means for generating a common electrode voltage and a plurality of gradation voltages, each of said plurality of gradation voltages alternately changing between two voltage levels, said gradation voltages having one central value which is equal to a central value of said common electrode voltage; and
driving means for selecting one of said plurality of gradation voltages according to said input digital video signal and applying the selected gradation voltage to one of said pixel electrodes, and for applying said common electrode voltage to said common electrode;
said voltage supply means including shifting means for shifting said common electrode voltage, based on transmissivity characteristics of said pixels of said display panel as a function of voltage applied to said pixel electrodes so that said central value of said common electrode voltage is different from said central value of said gradation voltages.

2. A drive circuit for a display apparatus according to claim 1, wherein said common electrode voltage alternately changes between two voltage levels.

3. A drive circuit for a display apparatus according to claim 1, wherein said common electrode voltage is a d.c. voltage.

4. A drive circuit for a display apparatus according to claim 1, wherein said voltage supply means includes means for shifting at least one of said gradation voltages based on said transmissivity characteristics of said pixels of said display panel as a function of voltage applied to said pixel electrodes so that a central value of said at least one of said gradation voltages is different from said central value of said remaining gradation voltages.

5. A drive circuit according to claim 1, wherein said shifting means variably shifts said common electrode voltage.

6. A drive circuit for a display apparatus having a display panel which includes a plurality of pixels, pixel electrodes and a common electrode for driving said plurality of pixels, said drive circuit comprising:

means for receiving a digital video signal;

voltage supply means for generating a common electrode voltage and a plurality of gradation voltages, each of said plurality of gradation voltages alternately changing between two voltage levels, said gradation voltages having one central value which is equal to a central value of said common electrode voltage; and driving means for selecting one of said plurality of gradation voltages according to said input digital video signal and applying the selected gradation voltage to one of said pixel electrodes, and for applying said common electrode voltage to said common electrode;

said voltage supply means including means for shifting means for shifting at least one of said gradation voltages, based on transmissivity characteristics of said pixels of said display panel as a function of voltage applied to said pixel electrodes so that said central value of said at least one of said gradation voltages is different from one of central values of said remaining gradation voltages.

7. A drive circuit for a display apparatus according to claim 6, wherein said common electrode voltage alternately changes between two voltage levels.

8. A drive circuit for a display apparatus according to claim 6, wherein said common electrode voltage is a d.c. voltage.

9. A drive circuit according to claim 6, wherein said shifting means variably shifts at least one of said gradation voltage.

* * * * *

UNITED STATES PATENT AND TRADEMARK OFFICE
CERTIFICATE OF CORRECTION

PATENT NO. : 5,402,142    Page 1 of 3

DATED : March 28, 1995

INVENTOR(S) : Okada et al.

It is certified that error appears in the above-indentified patent and that said Letters Patent is hereby corrected as shown below:

In Column 1, line 61, please delete "$\leq$" and insert -- $<$ --.

In Column 1, line 62, please delete "$\leq$" and insert -- $<$ --.

On Sheet 2 of 11 of the Drawings, please replace the enclosed drawing sheet of Figure 2.

On Sheet 11 of 11 of the Drawings, please replace the enclosed drawing sheet of Figure 15.

Signed and Sealed this

Third Day of September, 1996

Attest:

BRUCE LEHMAN

*Attesting Officer*   *Commissioner of Patents and Trademarks*